US009245383B2

(12) United States Patent
Co

(10) Patent No.: US 9,245,383 B2
(45) Date of Patent: Jan. 26, 2016

(54) ACCELERATED THREE-DIMENSIONAL INTERSECTION TESTING USING COMPRESSED VOLUMES

(71) Applicant: Google Inc., Mountain View, CA (US)

(72) Inventor: Christopher S. Co, San Jose, CA (US)

(73) Assignee: Google Inc., Mountain View, CA (US)

( * ) Notice: Subject to any disclaimer, the term of this patent is extended or adjusted under 35 U.S.C. 154(b) by 325 days.

(21) Appl. No.: 13/897,553

(22) Filed: May 20, 2013

(65) Prior Publication Data

US 2015/0154796 A1    Jun. 4, 2015

Related U.S. Application Data

(60) Provisional application No. 61/684,329, filed on Aug. 17, 2012.

(51) Int. Cl.
*G06T 17/00*    (2006.01)
*G06T 17/20*    (2006.01)
*G06T 9/00*    (2006.01)
*G06T 9/40*    (2006.01)

(52) U.S. Cl.
CPC ............. *G06T 17/20* (2013.01); *G06T 9/001* (2013.01); *G06T 9/40* (2013.01); *G06T 17/005* (2013.01)

(58) Field of Classification Search
None
See application file for complete search history.

(56) References Cited

U.S. PATENT DOCUMENTS

| 5,579,455 | A | * | 11/1996 | Greene et al. | 345/422 |
| 6,031,548 | A | * | 2/2000 | Gueziec et al. | 345/440 |
| 2005/0285858 | A1 | * | 12/2005 | Yang et al. | 345/420 |
| 2009/0256845 | A1 | * | 10/2009 | Sevastianov et al. | 345/426 |

OTHER PUBLICATIONS

Chhugani et al., "vLOD—High-Fidelity Walkthrough of Large Virtual Environments," IEEE, vol. 11, No. 1, 2005.*

* cited by examiner

*Primary Examiner* — Kee M Tung
*Assistant Examiner* — Nicholas R Wilson
(74) *Attorney, Agent, or Firm* — Lerner, David, Littenberg, Krumholz & Mentlik, LLP

(57) ABSTRACT

Aspects of the present disclosure relate to building volumetric data structures for intersection testing. For example, 3D data may be represented by points associated with triangles. The triangles may be rasterized to a 3D grid. Each cell of the grid may contain a set of triangles. The grid may be used to generate a new grid of larger grid cells, where each larger grid cell represents some portion of cells of the original grid. The triangle data from each new cell may then be encoded as a list of integers including the triangle data. The list of values may be run-length-encoded. The result is a single octree cube. This process may be repeated in order to generate additional octree cubes for the volumetric structure. The volumetric structure may then be used to identify triangles that intersect with a given ray.

27 Claims, 5 Drawing Sheets

ACCELERATED THREE-DIMENSIONAL INTERSECTION TESTING USING COMPRESSED VOLUMES

CROSS REFERENCE TO RELATED APPLICATION

The present application claims the benefit of the filing date of U.S. Provisional Patent Application No. 61/684,329 filed Aug. 17, 2012, the entire disclosure of which is hereby incorporated herein by reference.

BACKGROUND OF THE INVENTION

An octree is a data structure that may be used to store and access three-dimensional ("3D") data. Octrees may divide the 3D data in to 8 sections or octants. Various 3D graphic and gaming systems use octree data structures. Triangle meshes are another data structure that may be used to store and access 3D data. In a triangle mesh, triangles are connected at their vertices to form a 3D representation of data. Triangle meshes may be used by various graphics and modeling systems.

A triangle mesh representing a large portion of the world, as in a map or virtual world, may encompass so much data that it is difficult for a single client machine to manipulate or use efficiently. In some example, large triangle meshes or a large virtual world may be divided into smaller portions which can be fetched, decoded, and drawn in realtime.

SUMMARY

One aspect of the disclosure provides a method. The method includes rasterizing a triangular mesh of three-dimensional data represented by points associated with the vertices of triangles to a first 3D grid arranged in a cube. Each grid cell of the first 3D grid includes a list of triangle records of that portion of the triangular mesh. Each triangle record of the list of triangle records includes an integer triangle identifier and an integer mesh identifier. The method also includes grouping the cells of the first 3D grid into 8 sections to form a second 3D grid where each grid cell of the second 3D grid represents ⅛ of a total number of grid cells of the first 3D grid. A processor encodes the triangular records from each grid cell of the second 3D grid as a list of integers. The list of integers includes at least one integer for each grid cell of the second 3D grid. The method also includes compressing the list of integers and storing the compressed list of integers as an octree cube.

In one example, the first 3D grid is a 256 by 256 by 256 grid having 256^3 grid cells and the second 3D grid is a 64 by 64 by 64 grid having 64^3 grid cell, and each grid cell of the second 3D grid includes 4^3 grid cells of the first 3D grid. In another example, the compressing of the list of integers includes run-length-encoding the list of integers. In another example, the method also includes generating a second octree cube from a second triangle mesh and storing the octree cube as well as the second octree cube as a volumetric structure.

In another example, the method also includes identifying the octree cube as intersecting with a given ray; identifying a grid cell of the second 3D grid that intersects with the given ray and is associated with compressed data of the compressed list of integers; computing ray-triangle intersection tests on each triangle of the identified grid cell by decompressing the compressed list of integers for the identified grid cell; and when a ray-triangle intersection test of the computed ray-triangle intersection tests indicates that there is a particular triangle that intersects with the given ray, providing information associated with the particular triangle. In this example, the method also includes, when the ray-triangle intersection test indicate that there are no triangles that intersect with the given ray, identifying a second grid cell of the second 3D grid that intersects with the given ray and is associated with compressed data of the compressed list of integers; computing second ray-triangle intersection tests on each triangle of the identified second grid cell by decompressing the compressed list of integers for the second grid cell; and when a second ray-triangle intersection test of the second computed ray-triangle intersection tests indicates that there is a particular triangle that intersects with the given ray, providing information associated with the particular triangle. The method also includes, when the second ray-triangle intersection tests indicate that there is no triangle that intersects with the given ray, performing additional ray-triangle intersection tests until a triangle that intersects with the given ray is identified or until an end of the octree cube is reached.

Another aspect of the disclosure provides a system. The system includes memory storing a triangular mesh of three-dimensional data represented by points associated with the vertices of triangles. Each grid cell of the first 3D grid includes a list of triangle records of that portion of the triangular mesh. Each triangle record of the list of triangle records includes an integer triangle identifier and an integer mesh identifier. The system also includes a processor configured to rasterize the triangular mesh to a first 3D grid arranged in a cube; group the cells of the first 3D grid into 8 sections to form a second 3D grid where each grid cell of the second 3D grid represents ⅛ of a total number of grid cells of the first 3D grid; encode the triangular records from each grid cell of the second 3D grid as a list of integers, where the list of integers includes at least one integer for each grid cell of the second 3D grid; compress the list of integers; and store the compressed list of integers as an octree cube.

In one example, the first 3D grid is a 256 by 256 by 256 grid having 256^3 grid cells and the second 3D grid is a 64 by 64 by 64 grid having 64^3 grid cell, and each grid cell of the second 3D grid includes 4^3 grid cells of the first 3D grid. In another example, the compressing of the list of integers includes run-length-encoding the list of integers. In another example, the processor is also configured to generate a second octree cube from a second triangle mesh and store the octree cube as well as the second octree cube as a volumetric structure.

In another example, the processor is also configured to identify the octree cube as intersecting with a given ray; identify a grid cell of the second 3D grid that intersects with the given ray and is associated with compressed data of the compressed list of integers; compute ray-triangle intersection tests on each triangle of the identified grid cell by decompressing the compressed list of integers for the identified grid cell; and when a ray-triangle intersection test of the computed ray-triangle intersection tests indicates that there is a particular triangle that intersects with the given ray, provide information associated with the particular triangle. In this example, the processor is also configured to, when the ray-triangle intersection test indicate that there are no triangles that intersect with the given ray, identify a second grid cell of the second 3D grid that intersects with the given ray and is associated with compressed data of the compressed list of integers; compute second ray-triangle intersection tests on each triangle of the identified second grid cell by decompressing the compressed list of integers for the second grid cell; and when a second ray-triangle intersection test of the second computed ray-triangle intersection tests indicates that there is a particular triangle that intersects with the given ray, provide information associated with the particular triangle. The processor is also configured to, when the second ray-triangle intersection tests indicate that there is no triangle that intersects with the given ray, perform additional ray-triangle intersection tests until a triangle that intersects with the given ray is identified or until an end of the octree cube is reached.

Another aspect of the disclosure provides a non-transitory, tangible computer-readable storage medium on which computer readable instructions of a program are stored. The instructions, when executed by a processor, cause the processor to perform a method. The method includes rasterizing a triangular mesh of three-dimensional data represented by points associated with the vertices of triangles to a first 3D grid arranged in a cube. Each grid cell of the first 3D grid includes a list of triangle records of that portion of the triangular mesh. Each triangle record of the list of triangle records includes an integer triangle identifier and an integer mesh identifier. The method also includes grouping the cells of the first 3D grid into 8 sections to form a second 3D grid where each grid cell of the second 3D grid represents ⅛ of a total number of grid cells of the first 3D grid. The method includes encoding triangular records from each grid cell of the second 3D grid as a list of integers. The list of integers includes at least one integer for each grid cell of the second 3D grid. The method also includes compressing the list of integers and storing the compressed list of integers as an octree cube.

In one example, the first 3D grid is a 256 by 256 by 256 grid having 256^3 grid cells and the second 3D grid is a 64 by 64 by 64 grid having 64^3 grid cell, and each grid cell of the second 3D grid includes 4^3 grid cells of the first 3D grid. In another example, the compressing of the list of integers includes run-length-encoding the list of integers. In another example, the method also includes generating a second octree cube from a second triangle mesh and storing the octree cube and the second octree cube as a volumetric structure.

In another example, the method also includes identifying the octree cube as intersecting with a given ray; identifying a grid cell of the second 3D grid that intersects with the given ray and is associated with compressed data of the compressed list of integers; computing ray-triangle intersection tests on each triangle of the identified grid cell by decompressing the compressed list of integers for the second grid cell; and when a ray-triangle intersection test of the computed ray-triangle intersection tests indicates that there is a particular triangle that intersects with the given ray, providing information associated with the particular triangle. In this example, the method also includes when the ray-triangle intersection test indicate that there are no triangles that intersect with the given ray, identifying a second grid cell of the second 3D grid that intersects with the given ray and is associated with compressed data of the compressed list of integers; computing second ray-triangle intersection tests on each triangle of the identified second grid cell by decompressing the compressed list of integers for the second grid cell; and when a second ray-triangle intersection test of the second computed ray-triangle intersection tests indicates that there is a particular triangle that intersects with the given ray, providing information associated with the particular triangle. The method also includes, when the second ray-triangle intersection tests indicate that there is no triangle that intersects with the given ray, performing additional ray-triangle intersection tests until a triangle that intersects with the given ray is identified or until an end of the octree cube is reached.

A further aspect of the disclosure provides a method. The method includes receiving input from a user of a client device, the input identifying a given ray and accessing a volumetric structure defined by a plurality of octree cubes associated with a triangular mesh of triangles. Each octree cube of the plurality is associated with a compressed list of integers wherein the compressed list of integers represent the grid cells of a 3D grid, and at least some of the grid cells of the 3D grid are associated with compressed data defining an integer triangle identifier and an integer mesh identifiers for a triangle of the triangular mesh. The method also includes selecting an octree cube that intersects with the given ray; identifying a grid cell of the 3D grid associated with the selected octree cube that intersects with the given ray and is associated with compressed data; computing, by a processor ray-triangle intersection tests on each triangle of the identified grid cell by decompressing the compressed list of integers for the identified grid cell; and when a ray-triangle intersection test of the computed ray-triangle intersection tests indicates that there is a particular triangle of the triangular mesh that intersects with the given ray, providing information associated with the particular triangle.

In one example, the method also includes, when the ray-triangle intersection test indicate that there are no triangles that intersect with the given ray, identifying a second grid cell of the second 3D grid that intersects with the given ray and is associated with compressed data of the compressed list of integers; computing second ray-triangle intersection tests on each triangle of the identified second grid cell by decompressing the compressed list of integers for the second grid cell; and when a second ray-triangle intersection test of the second computed ray-triangle intersection tests indicates that there is a particular triangle that intersects with the given ray, providing information associated with the particular triangle. In this example, the method also includes, when the second ray-triangle intersection tests indicate that there is no triangle that intersects with the given ray, performing additional ray-triangle intersection tests until a triangle that intersects with the given ray is identified or until an end of the octree cube is reached.

Still another aspect of the disclosure provides a system. The system includes memory storing a volumetric structure defined by a plurality of octree cubes associated with a triangular mesh of triangles. Each octree cube of the plurality is associated with a compressed list of integers wherein the compressed list of integers represent the grid cells of a 3D grid, and at least some of the grid cells of the 3D grid are associated with compressed data defining an integer triangle identifier and an integer mesh identifiers for a triangle of the triangular mesh. The system also includes a processor configured to receive input from a user of a client device, the input identifying a given ray; access the memory; select an octree cube that intersects with the given ray; identify a grid cell of the 3D grid associated with the selected octree cube that intersects with the given ray and is associated with compressed data; compute ray-triangle intersection tests on each triangle of the identified grid cell by decompressing the compressed list of integers for the identified grid cell; and when a ray-triangle intersection test of the computed ray-triangle intersection tests indicates that there is a particular triangle of the triangular mesh that intersects with the given ray, provide information associated with the particular triangle.

In one example, the processor is also configured to, when the ray-triangle intersection test indicates that there are no triangles that intersect with the given ray, identify a second grid cell of the second 3D grid that intersects with the given ray and is associated with compressed data of the compressed list of integers; compute second ray-triangle intersection tests on each triangle of the identified second grid cell by decompressing the compressed list of integers for the second grid cell; and when a second ray-triangle intersection test of the second computed ray-triangle intersection tests indicates that there is a particular triangle that intersects with the given ray, provide information associated with the particular triangle. In this example, the processor is configured to, when the second ray-triangle intersection tests indicate that there is no triangle that intersects with the given ray, perform additional ray-triangle intersection tests until a triangle that intersects with the given ray is identified or until an end of the octree cube is reached.

DETAILED DESCRIPTION

Aspects of the disclosure relate generally to converting data stored as triangle meshes to octree cubes in a compressed state to allow for faster intersection testing. In one example, a triangular mesh may be rasterized to a first 3D grid arranged in a cube. Each grid cell of the first 3D grid may include a list of triangle records of the portion of the triangular mesh. A triangle record may include an integer triangle identifier and an integer mesh identifier. The cells of the first 3D grid may be grouped into 8 sections to form a second 3D grid. Each grid cell of the second 3D grid may represent ⅛ of a total number of grid cells of the first 3D grid. Triangular records from each grid cell of the second 3D grid may be encoded as a list of integers. The list of integers may then be compressed, for example, using run-length-encoding. The compressed list of integers may then be stored as an octree cube. This may be repeated to generate multiple octree cubes for a volumetric structure.

Once stored, the volumetric structure of octree cubes may then be used to determine whether and which triangle of the triangular mesh will intersect with a given ray (a line). For example, a specific octree cube of the volumetric structure that intersects with the given ray may be identified. Then, a grid cell of the specific octree cube that intersects with the given ray may also be identified. The identified grid cell is then examined to determine whether it is empty. If the identified grid cell is empty, a next grid cell of the octree cube that intersects with the given ray is identified and examined until a grid cell is identified which is not empty.

If the identified grid cell is not empty, ray-triangle intersection tests may be computed on each triangle in the cell. In some examples, this may be achieved by decompressing the compressed list of integers. If there is a triangle that intersects with the given ray, information identifying the intersecting triangle may be provided.

If there is no triangle that intersects with the given ray and the end of the octree cube has not been reached, a next grid cell of the octree cube that intersects with the given ray may be identified, and the process may continue as described above. If there is no triangle that intersects with the given ray and the end of the octree cube has been reached, a next octree cube of the volumetric structure that intersects with a given ray, and the process may continue as described above.

Figure 1:
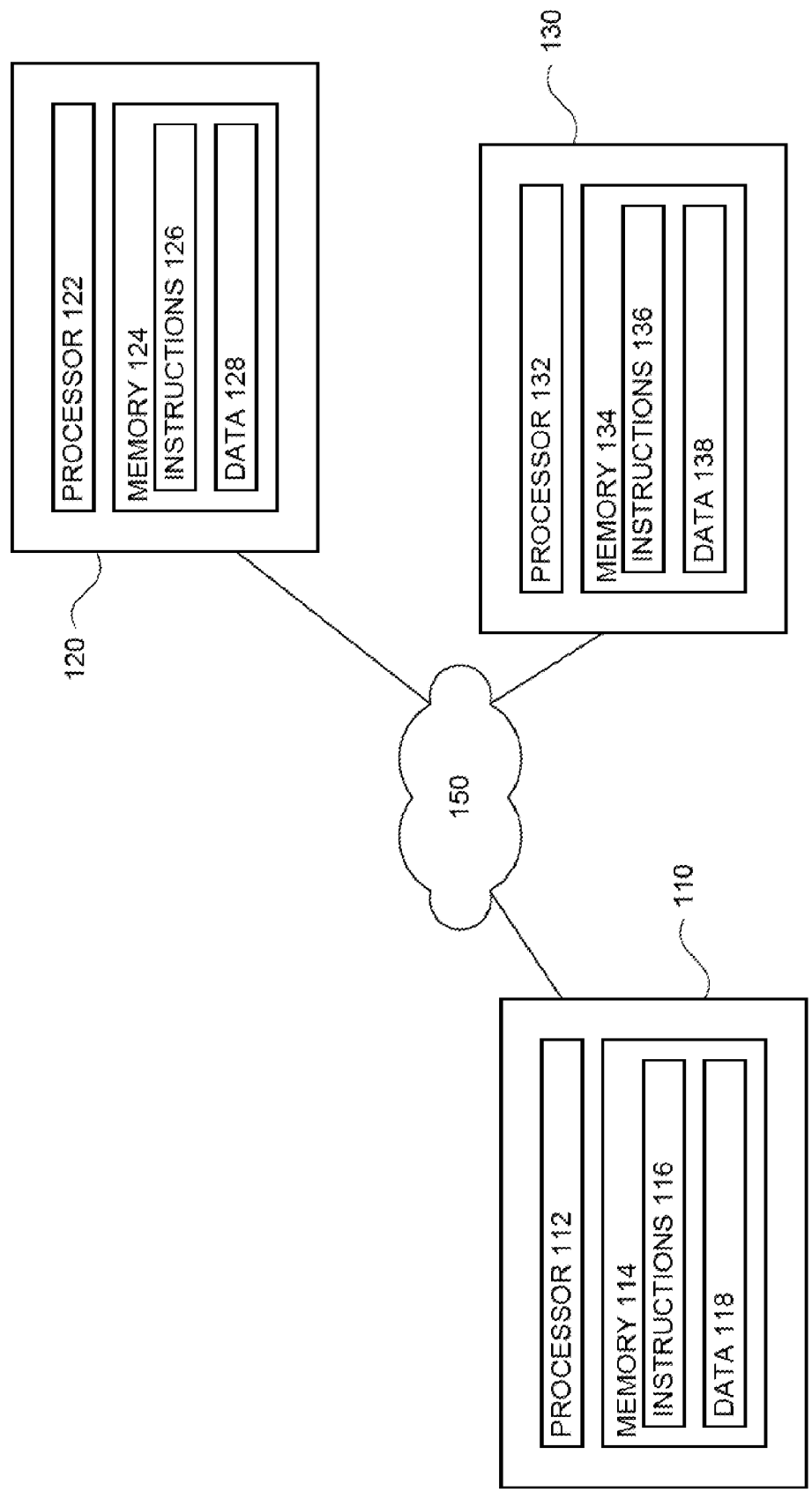
FIG. 1 is a functional diagram of a system in accordance with aspects of the disclosure.
Figure 2:
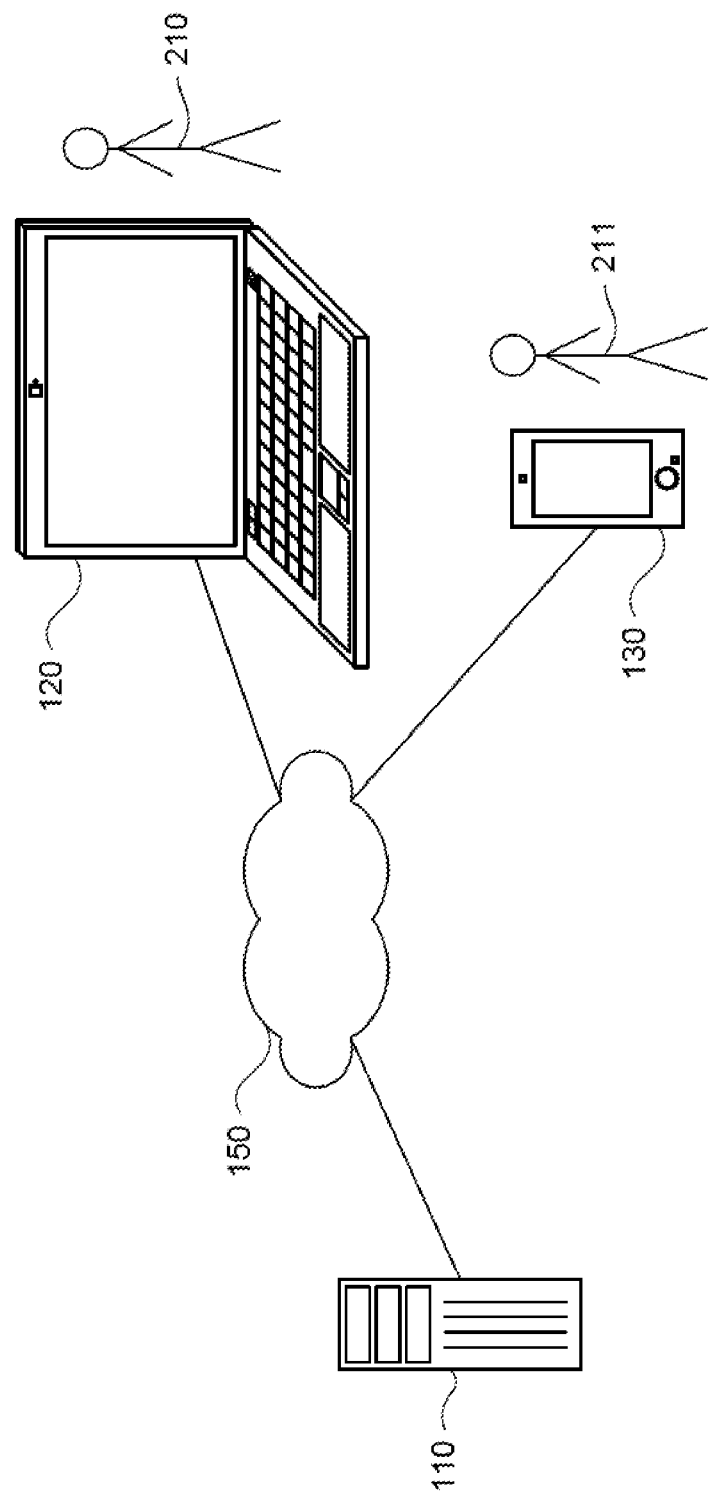
FIG. 2 is a pictorial diagram of the system of FIG. 1.

As shown in FIGS. 1-2, an example system 100 may include devices 110, 120, and 130. Device 110 may include a computer having a processor 112, memory 114 and other components typically present in general purpose computers. Memory 114 of computer 110 may store information accessible by processor 112, including instructions 116 that may be executed by the processor 112.

Memory may also include data 118 that may be retrieved, manipulated or stored by the processor. The memory may be of any type capable of storing information accessible by the processor, such as a hard-drive, memory card, ROM, RAM, DVD, CD-ROM, write-capable, and read-only memories.

The instructions 116 may be any set of instructions to be executed directly (such as machine code) or indirectly (such as scripts) by the processor. In that regard, the terms "instructions," "application," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 118 may be retrieved, stored or modified by processor 112 in accordance with the instructions 116. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

The processor 112 may be any conventional processor, such as commercially available CPUs. Alternatively, the processor may be a dedicated device such as an ASIC or other hardware-based processor. Although FIG. 1 functionally illustrates the processor, memory, and other elements of computer 110 as being within the same block, it will be understood by those of ordinary skill in the art that the processor, computer, or memory may actually comprise multiple processors, computers, or memories that may or may not be stored within the same physical housing. For example, memory may be a hard drive or other storage media located in a housing different from that of computer 110. Accordingly, references to a processor, computer, or memory will be understood to include references to a collection of processors, computers, or memories that may or may not operate in parallel.

The computer 110 may be at one node of a network 150 and capable of directly and indirectly communicating with other nodes, such as devices 120 and 130 of the network. The network 150 and intervening nodes described herein, may be interconnected via wires and/or wirelessly using various protocols and systems, such that each may be part of the Internet, World Wide Web, specific intranets, wide area networks, or local networks. These may use standard communications protocols or those proprietary to one or more companies, Ethernet, WiFi and HTTP, and various combinations of the foregoing.

Devices 120 and 130 may comprise a client device configured similarly to the computer 110, with a processor 122/132, memory 124/134, instructions 126/136, and data 128/138

(similar to processor 112, memory 114, instructions 116, and data 118). Client devices 120 and 130 may be a personal computer, intended for use by a user 210/211 having all the components normally found in a personal computer such as a central processing units (CPU), display device (for example, a monitor having a screen, a projector, a touch-screen, a small LCD screen, a television, or another device such as an electrical device that is operable to display information processed by the processor), CD-ROM, hard-drive, user inputs (for example, a mouse, keyboard, touch-screen or microphone), camera, speakers, modem and/or network interface device (telephone, cable or otherwise) and all of the components used for connecting these elements to one another. By way of example only, client devices 120 or 130 may be a laptop computer, wireless-enabled PDA, hand-held navigation device, tablet PC, netbook, music device, or a cellular phone.

Although the example of FIGS. 1 and 2 depicts only a few client devices, computer 110 may be in communication with a plurality of different devices. In this regard, computer 110 may transmit and receive information with the various client devices over network 150. Moreover, client devices and computers in accordance with the systems and methods described herein may comprise any device capable of processing instructions and transmitting data to and from humans and other computers including general purpose computers, PDAs, network computers lacking local storage capability, set-top boxes for televisions, and other networked devices.

Returning to FIG. 1, data 118 of computer 110 may store 3D data represented by points associated with the vertices of triangles. Together these vertices and triangles may form a triangle mesh. In one example, this 3D data may represent a digital surface or digital terrain model of some portion of the Earth. In this regard, the triangle mesh may form representations of a 3D environment such as a 3D model of terrain, roads, buildings, vegetation, etc.

Data 118 of computer 110 may also store an octree version of all or a portion of the triangular mesh data. The octree data may include a plurality of octrees. As described in more detail below, the triangular mesh data of the octrees may be stored in a compressed form.

Although some functions are indicated as taking place on a single computer having a single processor, various aspects of the system and method may be implemented by a plurality of computers, for example, communicating information over network 150. In this regard, computer 110 may also comprise a web server capable of communicating with the client devices 120. Server 110 may also comprise a plurality of computers, e.g., a load balanced server farm, that exchange information with different nodes of a network for the purpose of receiving, processing and transmitting data to the client devices. In this instance, the client devices will typically still be at different nodes of the network than any of the computers comprising server 110.

In addition to the operations described below and illustrated in the figures, various operations will now be described. It should also be understood that the following operations do not have to be performed in the precise order described below. Rather, various steps may be handled in a different order or simultaneously. Steps may also be omitted unless otherwise stated.

In order to generate volume data in the form of an octree, some portion of a triangular mesh may be rasterized to a first 3D grid arranged in a cube. In one example, the first 3D grid may include 256 grid cells on each side (256^3 or 256×256× 256). This first 3D grid may eventually form a single octree data structure. Other larger or smaller numbers of grid cells may also be used. The more grid cells that are used, the greater the number of grid cells which may be empty.

Each grid cell may contain (or represent) a list of triangle records of the portion of the triangular mesh. Each triangle record contains an integer triangle identifier and an integer mesh identifier. Thus, the mesh identifier may be an integer representing a particular mesh, and the triangle identifier may represent the location of a vertex of a triangle in a triangle list for that particular mesh. Thus, the triangular identifier may be an integer indicating the absolute position of a vertex data in an array of that particular triangular mesh. In one example, many of the grid cells may be empty or contain very few triangle records.

Figure 3:
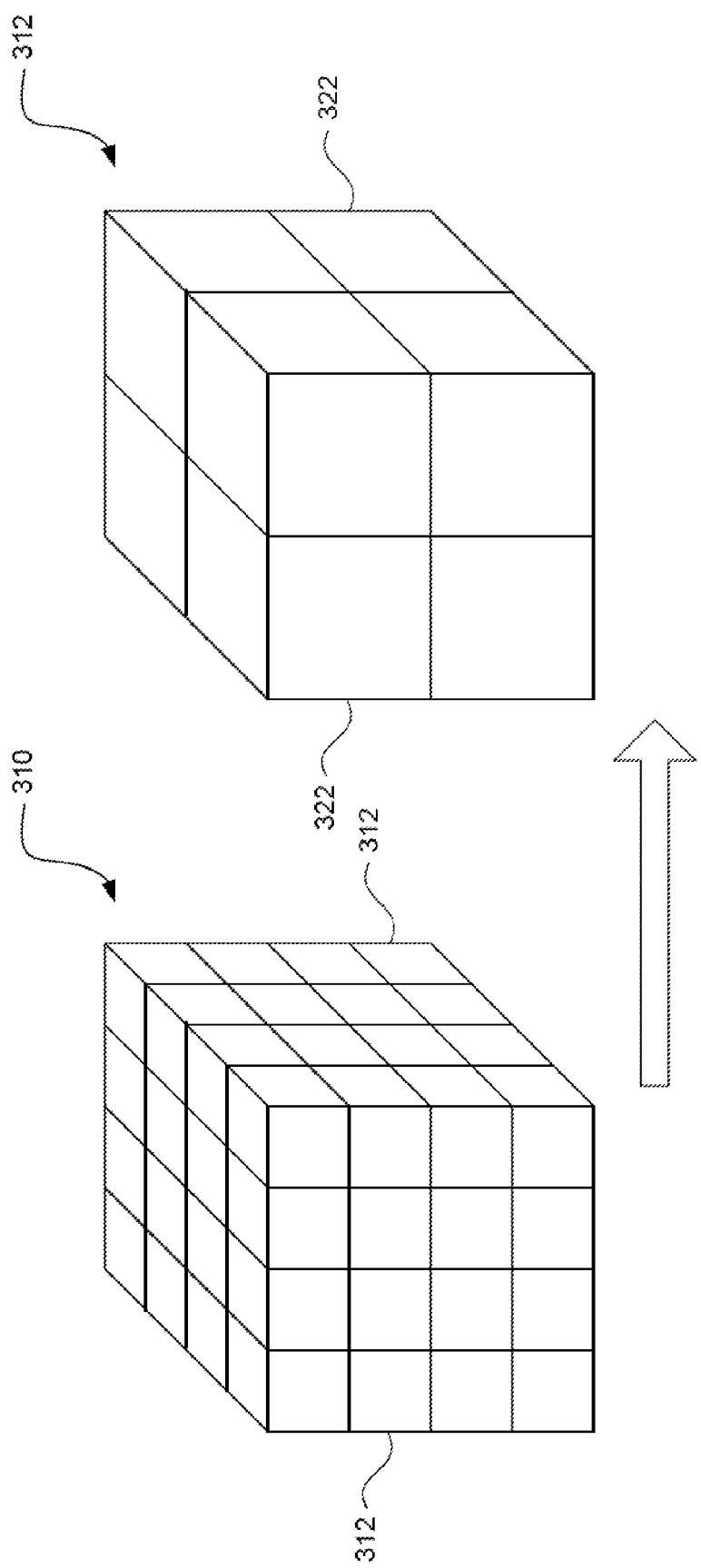
FIG. 3 is a diagram of example data in accordance with aspects of the disclosure.

The cells of the first 3D grid may be grouped into 8 sections or nodes to form a second 3D grid. Using the 256^3 grid cell example, each grid cell of the second 3D grid may include 64 grid cells on each side, or a 64^3 grid. In this example, each grid cell of the second 3D grid may represent the triangular records of 64 3D grid cells of the first 3D grid. FIG. 3 is a simplified visual representation of this grouping. Cube 310 is a representation of a first 3D grid having 64 grid cells 312. Cube 320 is a representation of a second 3D grid having 8 grid cells 322. Each grid cell 322 of cube 320 contains 8 grid cells 312 of cube 310. The number of grid cells of the first 3D grid which are associated with a particular grid cell of the second 3D grid may be depend upon the number of cells used in the first 3D grid.

The triangular records from each grid cell of the second 3D grid cell may be encoded as a list of integers. This list of integers may include the number of triangles in the cell as well as the integer mesh identifiers and integer triangle identifiers for all of the triangles of that grid cell of the second 3D grid. Thus, grid cell of the second 3D grid including one or more triangles of the portion of the triangular mesh may be associated with 2n+1 integers. For any grid cells which are empty, the list data for that grid cell may be zero. When included in a larger list of integers, each grid cell may also be represented by an integer. For example, a given cell's location with regard to the grid may be described by an (i,j,k) triplet. This triplet may be translated into a single integer offset from the beginning of the larger list of integers. Returning to the example of 256^3 and 64^3 of the first and second 3D grid cells, each of the triangular records of the 4^3 grid cells of the first 3D grid arranged into a grid cell of the second 3D grid may be encoded as a list of integers which may also include integers representing the location of the grid cells.

All of the values of the list of integers may then be compressed. For example, the integer values may be run-length-encoded. The result is a single octree cube. The octree cube may then be stored in memory for later use. This process may be repeated in order to generate additional octree cubes for other portions of the triangular mesh to generate a volumetric structure of octree cubes.

Figure 4:
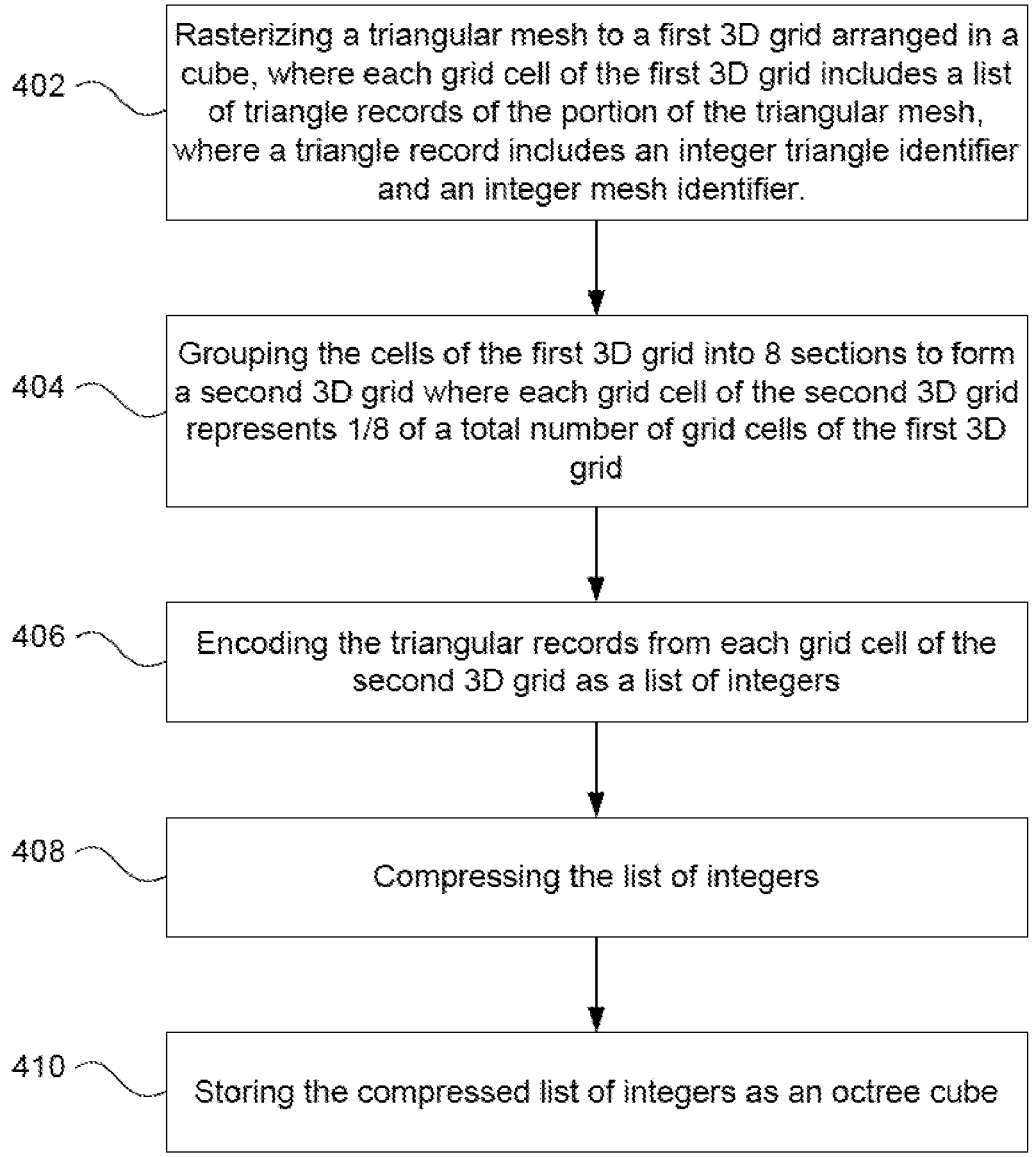
FIG. 4 is a flow diagram in accordance with aspects of the disclosure.
Figure 5:
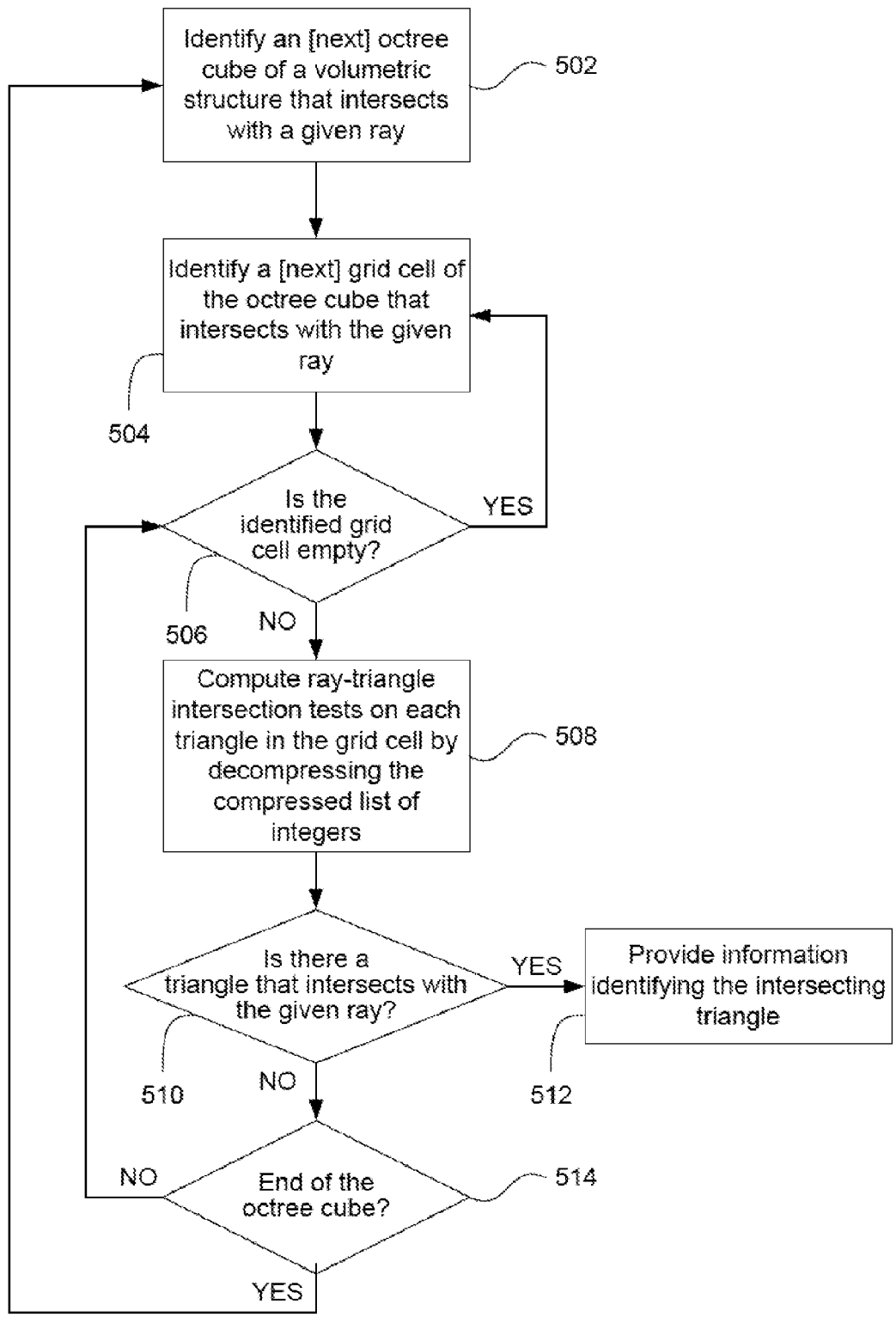
FIG. 5 is another flow diagram in accordance with aspects of the disclosure.

Flow diagram 400 of FIG. 4 is an example of some of the aspects above performed by computer 110. For example, at block 402, a triangular mesh is rasterized to a first 3D grid arranged in a cube. Each grid cell of the first 3D grid includes a list of triangle records of the portion of the triangular mesh. Again, a triangle record includes an integer triangle identifier and an integer mesh identifier. At block 404, the cells of the first 3D grid are grouped into 8 sections to form a second 3D grid. Each grid cell of the second 3D grid represents ⅛ of a total number of grid cells of the first 3D grid. At block 406, triangular records from each grid cell of the second 3D grid are encoded as a list of integers. The list of integers is then compressed at block 408, for example, using run-length-encoding. The compressed list of integers may then be stored as an octree cube at block 410. As noted above, this process may be repeated to generate multiple octree cubes for a volumetric structure.

Once stored, the volumetric structure of octree cubes may then be used to determine whether and which triangle of the triangular mesh will intersect with a given ray (a line). In order to do so, the computer 110 or client devices 120 or 130 may identify which if any of the octree cubes of the volumetric structure intersect with the given ray. For example, client device 120 or 130 may display a map of the 3D information associated with the triangular mesh. A user may select a particular point in a map. A ray may be generated using the perspective of the user viewing the map and the particular point. This perspective may include, for example, a view of a virtual camera in a 3D environment rendered using the triangular mesh. As noted above, the 3D environment may include a 3D model of the earth or another environment including, for example, views of terrain, buildings, and/or other features of the environment can be rendered using the mesh data.

Client devices 120 or 130 may send and receive information with computer 110 including the particular point, the ray, as well as all or only a portion of the volumetric structure. This information may be shared as needed, for example, in response to a specific request from a client device to the computer. Alternatively, the volumetric structure may be sent to and stored locally at client devices 120 and/or 130.

When the ray intersects with an octree cube, the octree cube may be examined to identify grid cells of the second 3D grid which include compressed triangle records and also intersect with the ray. For example, the given ray may be rasterized to the second 3D grid of the octree cube until a grid cell of the second 3D grid is identified which contains compressed triangle records or is not empty. If all of the grid cells of the octree cube with which the given ray intersects are empty or contain no compressed triangle records, the next octree cube with which the given ray intersects may be examined. Returning to the example above, the 64^3 grid of 4^3 grid cells may be examined until a cell is identified which is not empty or until the end of the octree cube is reached.

When a particular grid cell of the second 3D grid which contains compressed triangle records or is not empty, computer 110 (or client devices 120 or 130) may determine whether the given ray intersects with the triangle geometry of the triangle records of the particular grid cell. For example, ray-triangle intersection tests may be computed on each triangle in the cell by decoding the run-length-encoded list data of triangle records. The run-length encoding compresses the linear array but can be decoded quickly to determine the next location traversed by the given ray. In some examples, the compressed array may also stay compressed and need not be completely decoded.

When there is an intersection with a triangle, the computer 110 (or client devices 120 or 130) may provide information identifying a triangle. For example, the exact point of intersection may be computed. This may then be used by a navigation library to position a camera or display a view of that point. In another example, a geographic search query may be created from the point of intersection and information about that geographic location may be fetched. This may include identifying a building, what the building is, when it was constructed, etc. Some or all of the aforementioned information, point, search results, etc. may be displayed to a user, for example, on a display.

When there is no intersection between the given ray and any triangles of the particular grid cell, the computer 110 (or client devices 120 or 130) may examine the next grid cell of the second 3D grid with which the given ray intersects to determine whether the given ray intersects with the triangle geometry of the triangle records of the next grid cell. If the end of the octree cube is reached, the next octree cube which intersects with the given ray may be examined, and the process may continue as described above.

Flow diagram 500 of FIGURE is an example of some of the aspects described above performed by computer 110, client devices 120 or 130, or any combination of these. For example, at block 502, an octree cube of a volumetric structure that intersects with a given ray is identified. The octree cube and volumetric structure may be generated, for example, based on the example of flow diagram 400 of FIG. 4. A grid cell of the octree cube that intersects with the given ray is identified at block 504. If the identified grid cell is empty at block 506, the computer 110 returns to block 504 to identify a next grid cell of the octree cube that intersects with the given ray and continues with block 506, etc.

Returning to block 506, if the identified grid cell is not empty, ray-triangle intersection tests are computed on each triangle in the cell by decompressing the compressed list of integers at block 508. If there is a triangle that intersects with the given ray at block 510, information identifying the intersecting triangle is provided at block 512.

Returning to block 510, if there is no triangle that intersects with the given ray, computer 110 determines whether the end of an octree cube has been reached at block 514. If it is not the end of the octree cube, the computer 110 returns to block 504 to identify a next grid cell of the octree cube that intersects with the given ray and continues with block 506, etc. If it is the end of the octree cube at block 514, the computer 110 returns to block 502 to identify a next octree cube of the volumetric structure that intersects with a given ray and continues with block 504, etc.

The numerals used above to define the area of the grids, cells, octrees, etc. (such as 256, 64, 4, etc.) are merely examples. These numbers may be selected arbitrarily or may depend upon the number of vertices in the given portion of the triangular mesh or the granularity of the mesh. In the examples above, the 256^3 grid may be used based on the finest level of granularity of the triangular mesh.

As these and other variations and combinations of the features discussed above can be utilized without departing from the subject matter defined by the claims, the foregoing description of the embodiments should be taken by way of illustration rather than by way of limitation of the subject matter defined by the claims. It will also be understood that the provision of the examples described herein (as well as clauses phrased as "such as," "including" and the like) should not be interpreted as limiting the invention to the specific examples; rather, the examples are intended to illustrate only one of many possible embodiments. Further, the same reference numbers in different drawings may identify the same or similar elements.

The invention claimed is:

1. A method comprising:
   rasterizing a triangular mesh of three-dimensional data represented by points associated with the vertices of triangles to a first 3D grid arranged in a cube, where each grid cell of the first 3D grid includes a list of triangle records of that portion of the triangular mesh, wherein each triangle record of the list of triangle records includes both an integer mesh identifier representing a particular triangle mesh and an integer triangle identifier indicating an absolute position of a vertex in an array of the particular triangle mesh;

grouping the cells of the first 3D grid into 8 sections to form a second 3D grid where each grid cell of the second 3D grid represents ⅛ of a total number of grid cells of the first 3D grid;

encoding, by a processor, the triangular records for each given grid cell of the second 3D grid as a list of integers including a number of triangular records in the given grid cell, any integer triangle identifiers for the triangular records for the given grid cell, and any integer mesh identifiers for the triangular records for the given grid cell, wherein the list of integers includes at least one integer for each grid cell of the second 3D grid such that the list of integers for one of the given grid cells includes at least (1) an integer corresponding to the one of the given grid cells, (2) an integer greater than 0 identifying a number of triangular records in the one of the given grid cells, (3) an integer triangle identifier for a triangular record for the one of the given grid cells, and (4) an integer mesh identifier for a triangle record of the one of the given grid cells;

compressing the list of integers; and storing the compressed list of integers as an octree cube.

2. The method of claim 1, wherein the first 3D grid is a 256 by 256 by 256 grid having 256^3 grid cells and the second 3D grid is a 64 by 64 by 64 grid having 64^3 grid cell, and each grid cell of the second 3D grid includes 4^3 grid cells of the first 3D grid.

3. The method of claim 1, wherein the compressing of the list of integers includes run-length-encoding the list of integers.

4. The method of claim 1, further comprising:

generating a second octree cube from a second triangle mesh; and storing the octree cube and the second octree cube as a volumetric structure.

5. The method of claim 1, further comprising:

identifying the octree cube as intersecting with a given ray;

identifying a grid cell of the second 3D grid that intersects with the given ray and is associated with compressed data of the compressed list of integers;

computing ray-triangle intersection tests on each triangle of the identified grid cell by decompressing the compressed list of integers for the identified grid cell; and when a ray-triangle intersection test of the computed ray-triangle intersection tests indicates that there is a particular triangle that intersects with the given ray, providing information associated with the particular triangle.

6. The method of claim 5, further comprising:

when the ray-triangle intersection test indicate that there are no triangles that intersect with the given ray, identifying a second grid cell of the second 3D grid that intersects with the given ray and is associated with compressed data of the compressed list of integers;

computing second ray-triangle intersection tests on each triangle of the identified second grid cell by decompressing the compressed list of integers for the second grid cell; and when a second ray-triangle intersection test of the second computed ray-triangle intersection tests indicates that there is a particular triangle that intersects with the given ray, providing information associated with the particular triangle.

7. The method of claim 6, further comprising, when the second ray-triangle intersection tests indicate that there is no triangle that intersects with the given ray, performing additional ray-triangle intersection tests until a triangle that intersects with the given ray is identified or until an end of the octree cube is reached.

8. A system comprising:

memory storing a triangular mesh of three-dimensional data represented by points associated with the vertices of triangles, where each grid cell of the first 3D grid includes a list of triangle records of that portion of the triangular mesh, wherein each triangle record of the list of triangle records includes an integer triangle identifier and an integer mesh identifier;

a processor configured to:

rasterize the triangular mesh to a first 3D grid arranged in a cube;

group the cells of the first 3D grid into 8 sections to form a second 3D grid where each grid cell of the second 3D grid represents ⅛ of a total number of grid cells of the first 3D grid;

encode the triangular records for each given grid cell of the second 3D grid as a list of integers including a number of triangular records in the given grid cell, any integer triangle identifiers for the triangular records for the given grid cell, and any integer mesh identifiers for the triangular records for the given grid cell, wherein the list of integers includes at least one integer for each grid cell of the second 3D grid such that the list of integers for one of the given grid cells includes at least (1) an integer corresponding to the one of the given grid cells, (2) an integer greater than 0 identifying a number of triangular records in the one of the given grid cells, (3) an integer triangle identifier for a triangular record for the one of the given grid cells, and (4) an integer mesh identifier for a triangle record of the one of the given grid cells;

compress the list of integers; and store the compressed list of integers as an octree cube.

9. The system of claim 8, wherein the first 3D grid is a 256 by 256 by 256 grid having 256^3 grid cells and the second 3D grid is a 64 by 64 by 64 grid having 64^3 grid cell, and each grid cell of the second 3D grid includes 4^3 grid cells of the first 3D grid.

10. The system of claim 8, wherein the compressing of the list of integers includes run-length-encoding the list of integers.

11. The system of claim 8, wherein the processor is further configured to:

generate a second octree cube from a second triangle mesh; and store the octree cube and the second octree cube as a volumetric structure.

12. The system of claim 8, wherein the processor is further configured to:

identify the octree cube as intersecting with a given ray;

identify a grid cell of the second 3D grid that intersects with the given ray and is associated with compressed data of the compressed list of integers;

compute ray-triangle intersection tests on each triangle of the identified grid cell by decompressing the compressed list of integers for the second grid cell; and when a ray-triangle intersection test of the computed ray-triangle intersection tests indicates that there is a particular triangle that intersects with the given ray, provide information associated with the particular triangle.

13. The system of claim 12, wherein the processor is further configured to:

when the ray-triangle intersection test indicate that there are no triangles that intersect with the given ray, identify a second grid cell of the second 3D grid that intersects with the given ray and is associated with compressed data of the compressed list of integers;

compute second ray-triangle intersection tests on each triangle of the identified second grid cell by decompressing the compressed list of integers for the second grid cell; and when a second ray-triangle intersection test of the second computed ray-triangle intersection tests indicates that there is a particular triangle that intersects with the given ray, provide information associated with the particular triangle.

14. The system of claim 13, wherein the processor is further configured to, when the second ray-triangle intersection tests indicate that there is no triangle that intersects with the given ray, perform additional ray-triangle intersection tests until a triangle that intersects with the given ray is identified or until an end of the octree cube is reached.

15. A non-transitory, tangible computer-readable storage medium on which computer readable instructions of a program are stored, the instructions, when executed by a processor, cause the processor to perform a method, the method comprising:

rasterizing a triangular mesh of three-dimensional data represented by points associated with the vertices of triangles to a first 3D grid arranged in a cube, where each grid cell of the first 3D grid includes a list of triangle records of that portion of the triangular mesh, wherein each triangle record of the list of triangle records includes an integer triangle identifier and an integer mesh identifier;

grouping the cells of the first 3D grid into 8 sections to form a second 3D grid where each grid cell of the second 3D grid represents ⅛ of a total number of grid cells of the first 3D grid;

encoding, by a processor, the triangular records for each given grid cell of the second 3D grid as a list of integers including a number of triangular records in the given grid cell, any integer triangle identifiers for the triangular records for the given grid cell, and any integer mesh identifiers for the triangular records for the given grid cell, wherein the list of integers includes at least one integer for each grid cell of the second 3D grid such that the list of integers for one of the given grid cells includes at least (1) an integer corresponding to the one of the given grid cells, (2) an integer greater than 0 identifying a number of triangular records in the one of the given grid cells, (3) an integer triangle identifier for a triangular record for the one of the given grid cells, and (4) an integer mesh identifier for a triangle record of the one of the given grid cells;

compressing the list of integers; and storing the compressed list of integers as an octree cube.

16. The medium of claim 15, wherein the first 3D grid is a 256 by 256 by 256 grid having 256^3 grid cells and the second 3D grid is a 64 by 64 by 64 grid having 64^3 grid cell, and each grid cell of the second 3D grid includes 4^3 grid cells of the first 3D grid.

17. The medium of claim 15, wherein the compressing of the list of integers includes run-length-encoding the list of integers.

18. The medium of claim 15, wherein the method further comprises:

generating a second octree cube from a second triangle mesh; and storing the octree cube and the second octree cube as a volumetric structure.

19. The medium of claim 15, wherein the method further comprises:

identifying the octree cube as intersecting with a given ray;

identifying a grid cell of the second 3D grid that intersects with the given ray and is associated with compressed data of the compressed list of integers;

computing ray-triangle intersection tests on each triangle of the identified grid cell by decompressing the compressed list of integers for the identified grid cell; and when a ray-triangle intersection test of the computed ray-triangle intersection tests indicates that there is a particular triangle that intersects with the given ray, providing information associated with the particular triangle.

20. The medium of claim 19, wherein the method further comprises:

when the ray-triangle intersection test indicate that there are no triangles that intersect with the given ray, identifying a second grid cell of the second 3D grid that intersects with the given ray and is associated with compressed data of the compressed list of integers;

computing second ray-triangle intersection tests on each triangle of the identified second grid cell by decompressing the compressed list of integers for the second grid cell; and when a second ray-triangle intersection test of the second computed ray-triangle intersection tests indicates that there is a particular triangle that intersects with the given ray, providing information associated with the particular triangle.

21. The medium of claim 20, wherein the method further comprises, when the second ray-triangle intersection tests indicate that there is no triangle that intersects with the given ray, performing additional ray-triangle intersection tests until a triangle that intersects with the given ray is identified or until an end of the octree cube is reached.

22. A method comprising:

receiving input from a user of a client device, the input identifying a given ray;

accessing a volumetric structure defined by a plurality of octree cubes associated with a triangular mesh of triangles, wherein each octree cube of the plurality is associated with a compressed list of integers wherein the compressed list of integers represent the grid cells of a 3D grid, and at least some of the grid cells of the 3D grid are associated with compressed data defining an integer triangle identifier and an integer mesh identifiers for a triangle of the triangular mesh;

selecting an octree cube that intersects with the given ray;

identifying a grid cell of the 3D grid associated with the selected octree cube that intersects with the given ray and is associated with compressed data;

computing, by a processor, ray-triangle intersection tests on each triangle of the identified grid cell by decompressing the compressed list of integers for the identified grid cell; and when a ray-triangle intersection test of the computed ray-triangle intersection tests indicates that there is a particular triangle of the triangular mesh that intersects with the given ray, providing information associated with the particular triangle.

23. The method of claim 22, further comprising:

when the ray-triangle intersection test indicate that there are no triangles that intersect with the given ray, identifying a second grid cell of the second 3D grid that intersects with the given ray and is associated with compressed data of the compressed list of integers;

computing second ray-triangle intersection tests on each triangle of the identified second grid cell by decompressing the compressed list of integers for the second grid cell; and when a second ray-triangle intersection test of the second computed ray-triangle intersection tests indicates that there is a particular triangle that intersects with the given ray, providing information associated with the particular triangle.

24. The method of claim 23, further comprising, when the second ray-triangle intersection tests indicate that there is no triangle that intersects with the given ray, performing additional ray-triangle intersection tests until a triangle that intersects with the given ray is identified or until an end of the octree cube is reached.

25. A system comprising:

memory storing a volumetric structure defined by a plurality of octree cubes associated with a triangular mesh of triangles, wherein each octree cube of the plurality is associated with a compressed list of integers wherein the compressed list of integers represent the grid cells of a 3D grid, and at least some of the grid cells of the 3D grid are associated with compressed data defining an integer triangle identifier and an integer mesh identifiers for a triangle of the triangular mesh; and a processor configured to:
receive input from a user of a client device, the input identifying a given ray;
access the memory;
select an octree cube that intersects with the given ray;
identify a grid cell of the 3D grid associated with the selected octree cube that intersects with the given ray and is associated with compressed data;
compute ray-triangle intersection tests on each triangle of the identified grid cell by decompressing the compressed list of integers for the identified grid cell; and
when a ray-triangle intersection test of the computed ray-triangle intersection tests indicates that there is a particular triangle of the triangular mesh that intersects with the given ray, provide information associated with the particular triangle.

26. The system of claim 25, wherein the processor is further configured to:
when the ray-triangle intersection test indicates that there are no triangles that intersect with the given ray, identify a second grid cell of the second 3D grid that intersects with the given ray and is associated with compressed data of the compressed list of integers;
compute second ray-triangle intersection tests on each triangle of the identified second grid cell by decompressing the compressed list of integers for the second grid cell; and
when a second ray-triangle intersection test of the second computed ray-triangle intersection tests indicates that there is a particular triangle that intersects with the given ray, provide information associated with the particular triangle.

27. The system of claim 26, wherein the processor is further operable to, when the second ray-triangle intersection tests indicate that there is no triangle that intersects with the given ray, perform additional ray-triangle intersection tests until a triangle that intersects with the given ray is identified or until an end of the octree cube is reached.

* * * * *